(12) United States Patent
Hyodo et al.

(10) Patent No.: US 10,940,369 B2
(45) Date of Patent: Mar. 9, 2021

(54) RUBBER COMPOSITION FOR HOLLOW BALL AND HOLLOW BALL

(71) Applicant: SUMITOMO RUBBER INDUSTRIES, LTD., Hyogo (JP)

(72) Inventors: Takehiko Hyodo, Kobe (JP); Masanori Taguchi, Kobe (JP); Kazuyoshi Shiga, Kobe (JP); Fumiya Suzuki, Kobe (JP); Hiroaki Tanaka, Kobe (JP); Kunio Niwa, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 153 days.

(21) Appl. No.: 16/160,543

(22) Filed: Oct. 15, 2018

(65) Prior Publication Data
US 2019/0126104 A1      May 2, 2019

(30) Foreign Application Priority Data
Oct. 30, 2017      (JP) .............................. JP2017-209399

(51) Int. Cl.
| | |
|---|---|
| A63B 39/02 | (2006.01) |
| C08K 3/04 | (2006.01) |
| C08L 7/00 | (2006.01) |
| C08J 3/20 | (2006.01) |
| C08L 9/00 | (2006.01) |
| C08K 7/06 | (2006.01) |
| C08K 3/34 | (2006.01) |
| A63B 39/00 | (2006.01) |
| A63B 102/02 | (2015.01) |

(52) U.S. Cl.
CPC .............. *A63B 39/02* (2013.01); *A63B 39/00* (2013.01); *C08J 3/203* (2013.01); *C08K 3/04* (2013.01); *C08K 3/041* (2017.05); *C08K 3/042* (2017.05); *C08K 3/34* (2013.01); *C08K 3/346* (2013.01); *C08K 7/06* (2013.01); *C08L 7/00* (2013.01); *C08L 9/00* (2013.01); *A63B 2039/006* (2013.01); *A63B 2039/022* (2013.01); *A63B 2102/02* (2015.10); *C08J 2307/00* (2013.01); *C08J 2309/00* (2013.01); *C08J 2407/00* (2013.01); *C08J 2409/00* (2013.01); *C08K 2201/003* (2013.01); *C08K 2201/008* (2013.01); *C08K 2201/016* (2013.01)

(58) Field of Classification Search
CPC .... A63B 2039/022; A63B 39/02; C08K 3/042
See application file for complete search history.

(56) References Cited

U.S. PATENT DOCUMENTS 7,923,491 B2 *    4/2011    Weng .................... B60C 1/0008
                                                              524/13

FOREIGN PATENT DOCUMENTS

| JP | S61-143455 A | 7/1986 | |
|---|---|---|---|
| JP | 2004359894 A | * 12/2004 | |
| WO | WO-9853000 A1 | * 11/1998 | ............. C08G 69/36 |

OTHER PUBLICATIONS

Machine translation of JP 2004-359894 A, published Dec. 24, 2004. (Year: 2004).*

* cited by examiner

*Primary Examiner* — Vickey Nerangis
(74) *Attorney, Agent, or Firm* — Studebaker & Brackett PC (57) ABSTRACT

A rubber composition for a hollow ball includes a base rubber, an inorganic filler composed of a large number of flat particles, and a carbon-based filler. As to the carbon-based filler, a degree of flatness DLc obtained by dividing an average particle diameter $D_{50}{}^c$ (μm) by an average thickness Tc (μm) is not less than 50. A weight ratio Mc/Mi is not less than 0.01 and not greater than 1.00. The rubber composition is obtained by a production method including: a first step of mixing the base rubber and the carbon-based filler to obtain a master batch; and a second step of adding the large number of flat particles that form the inorganic filler, to the master batch to orient the large number of flat particles. The hollow ball 2 includes a core 4 formed from the rubber composition.

17 Claims, 3 Drawing Sheets

RUBBER COMPOSITION FOR HOLLOW BALL AND HOLLOW BALL

This application claims priority on Patent Application No. 2017-209399 filed in JAPAN on Oct. 30, 2017. The entire contents of this Japanese Patent Application are hereby incorporated by reference.

BACKGROUND OF THE INVENTION

Field of the Invention

The present invention relates to rubber compositions for hollow balls. Specifically, the present invention relates to rubber compositions for hollow balls, and hollow balls, for use in sports, etc.

Description of the Related Art

An example of typical hollow balls for use in sports is tennis balls. A tennis ball includes a core formed from a rubber composition. The core is a hollow sphere. In a tennis ball for use in regulation-ball tennis, the interior of the core is filled with compressed gas having a pressure that is higher than the atmospheric pressure by 40 kPa to 120 kPa. The tennis ball is also referred to as a pressurized tennis ball (pressure ball).

In tennis play, a tennis ball having high resilience performance is advantageous. In addition, a tennis ball having appropriate resilience performance provides favorable feel at impact to a player. With a pressurized tennis ball, excellent resilience performance and favorable feel at impact are imparted by the internal pressure of the core, which is higher than the atmospheric pressure. On the other hand, due to the internal pressure of the core being higher than the atmospheric pressure, the filled compressed gas gradually leaks from the core. Due to the leakage of the gas, the internal pressure of the core may decrease to a pressure close to the atmospheric pressure. The tennis ball in which the internal pressure of the core has decreased has inferior resilience performance and feel at impact. Tennis balls having resilience performance and feel at impact that are less changed with time are desired.

In JP61-143455, a rubber material including a scaly or tabular filler is proposed as a material for preventing leakage of gas.

In the rubber material disclosed in JP61-143455, the scaly or tabular filler inhibits permeation of gas and contributes to prevention of gas leakage. However, in the case with the scaly or tabular filler, depending on the amount thereof, contact between the fillers in the rubber material occurs, which increases the loss tangent tan δ of the rubber material. The loss tangent tan δ of the rubber material correlates to the resilience performance of a tennis ball obtained by using the rubber material. The increase in the loss tangent tan δ reduces the resilience performance of the tennis ball. The tennis ball having reduced resilience performance also has inferior feel at impact.

In particular, in the case of a tennis ball for competition, in light of fairness, the outer shape, the weight, the resilience performance (rebound), etc., thereof are limited within predetermined ranges by the International Tennis Federation. A tennis ball with a resilience performance that does not satisfy this standard cannot be used in any official competition. A rubber material, for a hollow ball, which has appropriate resilience performance and favorable feel at impact and can effectively prevent leakage of gas, has not been proposed yet.

An object of the present invention is to provide a rubber composition for a hollow ball and a hollow ball which have a high gas leakage prevention effect, have appropriate resilience performance and favorable feel at impact that can be maintained over a long period of time, and have excellent durability.

SUMMARY OF THE INVENTION

A rubber composition for a hollow ball according to the present invention includes a base rubber, an inorganic filler composed of a large number of flat particles, and a carbon-based filler. A degree of flatness DLc obtained by dividing an average particle diameter $D_{50}{}^c$ (μm) of the carbon-based filler by an average thickness Tc (μm) of the carbon-based filler is not less than 50. A weight ratio Mc/Mi of an amount Mc of the carbon-based filler to an amount Mi of the inorganic filler is not less than 0.01 and not greater than 1.00.

In the rubber composition for the hollow ball according to the present invention, the orientation of the large number of flat particles that form the inorganic filler is improved by including a small amount of the carbon-based filler having a degree of flatness DLc of not less than 50. Due to the improvement of the orientation of the inorganic filler, the gas permeability coefficient of the obtained rubber composition is decreased. A core formed from the rubber composition has an excellent gas barrier property. With a hollow ball including the core, a reduction in resilience performance and feel at impact due to excessive blending of the inorganic filler is suppressed. With the hollow ball, appropriate resilience performance and favorable feel at impact associated therewith can be maintained. The hollow ball has excellent durability.

Preferably, a nitrogen gas permeability coefficient $N_{2A}$ ($cm^3 \cdot cm/cm^2/sec/cmHg$) at 40° C. of the rubber composition satisfies the following formula (1).

$$N_{2A}/N_{2B} \leq 0.95 \quad (1)$$

wherein $N_{2B}$ is a nitrogen gas permeability coefficient ($cm^3 \cdot cm/cm^2/sec/cmHg$) at 40° C. of a rubber composition obtained by replacing the carbon-based filler having a degree of flatness DLc of not less than 50 with a carbon-based filler having a degree of flatness DLc of 1.

Preferably, the carbon-based filler includes carbon atoms by not less than 90% by weight of entire components thereof. Preferably, the carbon-based filler is selected from the group consisting of carbon fibers, graphites, graphenes, and carbon nanotubes. Preferably, the average particle diameter $D_{50}{}^c$ of the carbon-based filler is not less than 0.01 μm and not greater than 100 μm.

Preferably, a degree of flatness DLi obtained by dividing an average particle diameter $D_{50}{}^i$ (μm) of the inorganic filler by an average thickness Ti (μm) of the inorganic filler is not less than 5.

Preferably, the inorganic filler is selected from the group consisting of talc, kaolin clay, and mica.

Preferably, the average particle diameter $D_{50}{}^i$ of the inorganic filler is not less than 0.01 μm and not greater than 100 μm.

Preferably, an amount of the inorganic filler per 100 parts by weight of the base rubber is not less than 1 part by weight and not greater than 150 parts by weight.

Preferably, the base rubber includes a butadiene rubber and a natural rubber. Preferably, a weight ratio B/N of an amount B of the butadiene rubber to an amount N of the natural rubber in the base rubber is not greater than 1.4.

Preferably, the rubber composition has a sulfur content of not less than 0.01% by weight and not greater than 10% by weight.

Preferably, the rubber composition has a nitrogen gas permeability coefficient $N_{2A}$ at 40° C. of not greater than $3.0 \times 10^{-9}$ (cm$^3$·cm/cm$^2$/sec/cmHg).

Preferably, the rubber composition has a Shore A hardness Ha of not less than 20 and not greater than 88. Preferably, the rubber composition has a loss tangent tan δ at 20° C. of not greater than 1.0.

Preferably, a product of the hardness Ha of the rubber composition and elongation at break EB (%) of the rubber composition obtained according to JIS K6251 is not less than 1,000 and not greater than 100,000. Preferably, a product of the hardness Ha of the rubber composition and a toluene swelling ratio SW (%) of the rubber composition obtained according to JIS K6258 is not less than 2,500 and not greater than 50,000.

Preferably, the hollow ball is a tennis ball.

A method for producing the rubber composition for the hollow ball includes:

(1) a first step of mixing a base rubber and a carbon-based filler having a degree of flatness DLc of not less than 50, to obtain a master batch, the degree of flatness DLc being obtained by dividing an average particle diameter $D_{50}{}^c$ (μm) of the carbon-based filler by an average thickness Tc (μm) of the carbon-based filler; and (2) a second step of adding an inorganic filler composed of a large number of flat particles to the master batch to orient the large number of flat particles that form the inorganic filler, in the base rubber.

A weight ratio Mc/Mi of an amount Mc of the carbon-based filler to an amount Mi of the inorganic filler is not less than 0.01 and not greater than 1.00.

The hollow ball includes a hollow core formed from a rubber composition. The rubber composition includes a base rubber, an inorganic filler composed of a large number of flat particles, and a carbon-based filler. A degree of flatness DLc obtained by dividing an average particle diameter $D_{50}{}^c$ (μm) of the carbon-based filler by an average thickness Tc (μm) of the carbon-based filler is not less than 50. A weight ratio Mc/Mi of an amount Mc of the carbon-based filler to an amount Mi of the inorganic filler is not less than 0.01 and not greater than 1.00.

DESCRIPTION OF THE PREFERRED EMBODIMENTS

The following will describe in detail the present invention based on preferred embodiments with appropriate reference to the drawings.

Figure 1:
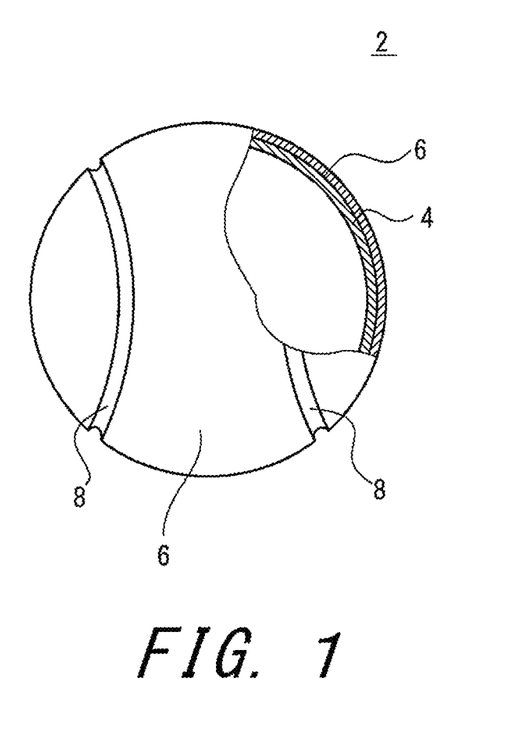
FIG. 1 is a partially cutaway cross-sectional view of a hollow ball according to an embodiment of the present invention.

FIG. 1 is a partially cutaway cross-sectional view of a hollow ball 2 according to an embodiment of the present invention. The hollow ball 2 is a tennis ball. The tennis ball 2 has a hollow core 4, two felt portions 6 covering the core 4, and a seam portion 8 positioned in the gap between the two felt portions 6. The thickness of the core 4 is normally about 3 mm to 4 mm. The interior of the core 4 is filled with compressed gas. The two felt portions 6 are attached to the surface of the core 4 by an adhesive.

The core 4 is formed from a rubber composition. A rubber composition according to an embodiment of the present invention is suitably used for forming the core 4. The rubber composition includes a base rubber, an inorganic filler, and a carbon-based filler. In the specification of the present application, the carbon-based filler is not included in the concept of the inorganic filler.

The inorganic filler is composed of a large number of flat particles. A degree of flatness DLc obtained by dividing an average particle diameter $D_{50}{}^c$ (μm) of the carbon-based filler by an average thickness Tc (μm) of the carbon-based filler is not less than 50. In other words, the carbon-based filler is also composed of a large number of flat particles. In the rubber composition according to the present invention, the large number of flat particles that form the carbon-based filler are dispersed in a matrix of a rubber component together with the large number of flat particles that form the inorganic filler. The large number of flat particles dispersed in the matrix inhibit movement of gas molecules.

In the present invention, the method for producing the rubber composition is not particularly limited. However, typically, the rubber composition is obtained by blending the base rubber that is a main component of the matrix, the inorganic filler, and the carbon-based filler, and heating and kneading these materials with a known kneading machine or the like. Due to the heating, the base rubber flows. With the flow of the base rubber, the large number of flat particles that form the inorganic filler and the large number of flat particles that form the carbon-based filler move.

The interaction between the carbon-based filler and the base rubber is strong. Due to the strong interaction, the large number of flat particles that form the carbon-based filler move together with the flowing base rubber, and are arranged along the direction of flow of the base rubber. In the rubber composition, the long axis directions of most of the flat particles that form the carbon-based filler are directed substantially in the direction of flow of the base rubber. The orientation of the carbon-based filler in the matrix of the rubber composition is high. The gas molecule movement inhibition effect by the large number of flat particles having high orientation and a degree of flatness DLc of not less than 50 is great.

On the other hand, the interaction between the inorganic filler and the base rubber is weak. Therefore, normally, the direction of movement of the large number of flat particles that form the inorganic filler is random, and does not necessarily coincide with the direction of flow of the base rubber. The gas molecule movement inhibition effect by the large number of flat particles dispersed randomly is small.

However, in the rubber composition according to the present invention, the large number of flat particles that form the inorganic filler move between the particles of the carbon-based filler arranged along the direction of flow of the base rubber. In other words, in the rubber composition, the carbon-based filler serves as a straightening vane in the flowing base rubber. Due to the straightening effect by the carbon-based filler, the large number of flat particles that form the inorganic filler having weak interaction with the base rubber are also arranged along the direction of flow of the base rubber. The orientation of the inorganic filler in the matrix of the rubber composition is high. The gas molecule movement inhibition effect by the inorganic filler having high orientation is great.

In the rubber composition, the orientation of the inorganic filler composed of the large number of flat particles is improved by the carbon-based filler having a degree of flatness DLc of not less than 50. Accordingly, the gas permeability coefficient of the rubber composition can be sufficiently reduced without excessively blending the inorganic filler. The core 4 formed from the rubber composition has an excellent gas barrier property. With the hollow ball 2 including the core 4, a reduction in resilience performance and feel at impact due to excessive blending of the inorganic filler is suppressed. With the hollow ball 2, appropriate resilience performance and favorable feel at impact associated therewith can be maintained. The hollow ball 2 has excellent durability.

In light of reduction of the gas permeability coefficient, a degree of flatness DLi obtained by dividing an average particle diameter $D_{50}^{i}$ (μm) of the inorganic filler by an average thickness Ti (μm) of the inorganic filler is preferably not less than 5, more preferably not less than 10, and further preferably not less than 20. In light of flowability and dispersibility into the base rubber, the degree of flatness DLi is preferably not greater than 200, more preferably not greater than 150, and further preferably not greater than 100. In the case where the inorganic filler includes an assembly or an aggregate of a plurality of particles, the degree of flatness DLi is calculated from an average particle diameter $D_{50}^{i}$ and an average thickness Ti obtained by measurement in a state where the assembly or the aggregate is included.

In the specification of the present application, the average particle diameter $D_{50}^{i}$ (μm) of the inorganic filler means an average particle diameter at a point of 50% by volume accumulated from the small-diameter side in a particle size distribution measured with a laser diffraction particle size distribution measuring instrument (for example, LMS-3000 manufactured by Seishin Enterprise Co., Ltd.). In light of reduction of the gas permeability coefficient, the average particle diameter $D_{50}^{i}$ of the inorganic filler is preferably not less than 0.01 μm, more preferably not less than 0.1 μm, and particularly preferably not less than 1 μm. In light of mixability with the base rubber, the average particle diameter $D_{50}^{i}$ is preferably not greater than 100 μm, more preferably not greater than 70 μm, and particularly preferably not greater than 50 μm.

In light of reduction of the gas permeability coefficient, the average thickness Ti of the inorganic filler is preferably not greater than 1.00 μm, more preferably not greater than 0.50 μm, and particularly preferably not greater than 0.20 μm. In light of mixability with the base rubber, the average thickness Ti is preferably not less than 0.002 μm, more preferably not less than 0.005 μm, and particularly preferably not less than 0.010 μm. The average thickness Ti of the inorganic filler is measured by the same method as for the average thickness Tc of the carbon-based filler described later.

Examples of the inorganic filler having a degree of flatness DLi of not less than 5 include talc, kaolin clay, mica, bentonite, halloysite, montmorillonite, beidellite, saponite, hectorite, nontronite, vermiculite, illite, and allophane. Preferably, the inorganic filler having a degree of flatness DLi of not less than 5 is selected from the group consisting of talc, kaolin clay, and mica. The rubber composition may include two or more types of inorganic fillers.

In light of reduction of the gas permeability coefficient, the amount Mi of the inorganic filler per 100 parts by weight of the base rubber is preferably not less than 1 part by weight, more preferably not less than 10 parts by weight, further preferably not less than 20 parts by weight, and particularly preferably not less than 25 parts by weight. In light of resilience performance and feel at impact, the amount Mi is preferably not greater than 150 parts by weight, more preferably not greater than 100 parts by weight, and particularly preferably not greater than 70 parts by weight.

As long as the advantageous effects of the present invention are not impaired, another inorganic filler having a degree of flatness DLi of less than 5 may be used in combination. Examples of the other inorganic filler include silica, calcium carbonate, magnesium carbonate, barium sulfate, and zinc oxide. In the case where an inorganic filler having a degree of flatness DLi of less than 5 is used in combination, in light of reduction of the gas permeability coefficient, the blending proportion of this inorganic filler is preferably not greater than 50% by weight, more preferably not greater than 40% by weight, and particularly preferably not greater than 30% by weight, of the total amount of the inorganic filler.

A main component of the carbon-based filler is carbon atoms. Preferably, the carbon-based filler is a carbon-based filler including carbon atoms by preferably not less than 90% by weight, more preferably not less than 95% by weight, and particularly preferably not less than 98% by weight, of the entire components thereof.

As described above, the degree of flatness DLc of the carbon-based filler included in the rubber composition according to the present invention is not less than 50. In light of straightening effect and reduction of the gas permeability coefficient, the degree of flatness DLc of the carbon-based filler is preferably not less than 70, more preferably not less than 100, further preferably not less than 150, and particularly preferably not less than 200. In light of flowability and dispersibility into the base rubber, the degree of flatness DLc is preferably not greater than 1000. In the case where the carbon-based filler includes an assembly or an aggregate of a plurality of particles, the degree of flatness DLc is calculated from an average particle diameter $D_{50}^{c}$ and an average thickness Tc obtained by measurement in a state where the assembly or the aggregate is included.

In the specification of the present application, the average particle diameter $D_{50}^{c}$ (μm) of the carbon-based filler means an average particle diameter at a point of 50% by volume accumulated from the small-diameter side in a particle size distribution measured with a laser diffraction particle size distribution measuring instrument (for example, LMS-3000 manufactured by Seishin Enterprise Co., Ltd.). In light of straightening effect and reduction of the gas permeability coefficient, the average particle diameter $D_{50}^{c}$ of the carbon-based filler is preferably not less than 0.01 μm, more preferably not less than 0.1 μm, and particularly preferably not less than 1.0 μm. In light of flowability and mixability with the base rubber, the average particle diameter $D_{50}^{c}$ is preferably not greater than 100 μm, more preferably not greater than 80 μm, and particularly preferably not greater than 70 μm.

In the specification of the present application, the average thickness Tc (μm) of the carbon-based filler is measured by observation with a microscope such as a transmission electron microscope. Specifically, particles having a size similar to the average particle diameter $D_{50}^c$ of the carbon-based filler are selected from an image obtained by observing a plurality of particles taken from the carbon-based filler with a transmission electron microscope (for example, H-9500 manufactured by Hitachi High-Technologies Corporation), and the thicknesses of the particles are measured. The average of measurement values obtained for 12 particles is regarded as the average thickness Tc.

In light of straightening effect and reduction of the gas permeability coefficient, the average thickness Tc of the carbon-based filler is preferably not greater than 1.00 μm, more preferably not greater than 0.50 μm, and particularly preferably not greater than 0.20 μm. In light of flowability and mixability with the base rubber, the average thickness Tc is preferably not less than 0.002 μm, more preferably not less than 0.005 μm, and particularly preferably not less than 0.010 μm.

In the rubber composition according to the present invention, as long as the degree of flatness DLc is not less than 50, the type of the carbon-based filler is not particularly limited. In light of straightening effect and reduction of the gas permeability coefficient, the carbon-based filler is preferably selected from the group consisting of carbon fibers, graphites, graphenes, and carbon nanotubes. Graphites and graphenes are more preferable, and graphenes are further preferable. The rubber composition may include two or more types of carbon-based fillers.

Normally, a graphene has a single-layer structure in which a large number of carbon atoms are bound to each other in a planar manner, and is also referred to as a graphene sheet. A graphene may include a laminate or an assembly of graphene sheets. In light of reduction of the gas permeability coefficient, the number of graphene sheets laminated is preferably not greater than 100, more preferably not greater than 50, and particularly preferably not greater than 20.

The method for producing a graphene is not particularly limited. For example, a graphene may be obtained from a graphite, a graphite oxide, or the like by a known method such as a peeling method, a sonication method, a chemical vapor deposition method, an epitaxial growth method, and the like. As long as the object of the present invention is achieved, commercially-available graphenes may be used. Specific examples thereof include trade name "xGnP-M-S" of XG Sciences, trade name "G-12" of EM Japan, trade name "GNP-Cl" of Graphene Laboratories, and trade name "iGrafen" of ITEC Co. Ltd.

A graphite is a carbon material obtained by laminating a plurality of graphene sheets such that each of the graphene sheets is slightly shifted from one another, and is also referred to as black lead. The type of and the production method for graphite are not particularly limited. Examples of graphites include natural graphites such as amorphous graphite, flake graphite, vein graphite, crystalline graphite, and the like, expansion graphites and expanded graphites obtained by processing natural graphites, and artificial graphites obtained by thermally treating amorphous carbon. As long as the object of the present invention is achieved, commercially-available graphites may be used. Specific examples thereof include trade names "SFG44", "C-THERM 011", and "P44" of IMERYS, and trade names "CP", "UP", and "GR" of Nippon Graphite Industries, Co., Ltd.

As a carbon nanotube, a single-walled carbon nanotube (SWNT) may be used, a multi-walled carbon nanotube (MWNT) may be used, or a mixture thereof may be used. In addition, the carbon nanotube may be a carbon nanotube having an arm-chair structure, may be a carbon nanotube having a zigzag structure, may be a carbon nanotube having a helical structure, or may be a mixture of these carbon nanotubes.

In the rubber composition according to the present invention, the weight ratio Mc/Mi of the amount Mc of the carbon-based filler having a degree of flatness DLc of not less than 50 to the amount Mi of the inorganic filler is set to be not less than 0.01 and not greater than 1.00. In the rubber composition in which the weight ratio Mc/Mi is not less than 0.01, the orientation of the inorganic filler is improved by the straightening effect of the carbon-based filler. From this viewpoint, the weight ratio Mc/Mi is preferably not less than 0.05 and particularly preferably not less than 0.1. The hollow ball 2 including the core 4 that is formed from the rubber composition in which the weight ratio Mc/Mi is not greater than 1.00 has excellent resilience performance and feel at impact. From this viewpoint, the weight ratio Mc/Mi is preferably not greater than 0.50 and particularly preferably not greater than 0.30.

The amount Mc of the carbon-based filler is not particularly limited, and is adjusted as appropriate such that the weight ratio Mc/Mi is not less than 0.01 and not greater than 1.00. In light of straightening effect and reduction of the gas permeability coefficient, the amount Mc per 100 parts by weight of the base rubber is preferably not less than 1 part by weight, more preferably not less than 2 parts by weight, and particularly preferably not less than 3 parts by weight. In light of cost reduction, the amount Mc is preferably not greater than 150 parts by weight, more preferably not greater than 100 parts by weight, and particularly preferably not greater than 50 parts by weight.

As long as the advantageous effects of the present invention are not impaired, another carbon-based filler having a degree of flatness DLc of less than 50 may be used in combination. Examples of the other carbon-based filler include carbon black, activated carbon, and fullerenes. In the case where a carbon-based filler having a degree of flatness DLc of less than 50 is used in combination, in light of straightening effect and reduction of the gas permeability coefficient, the blending proportion of this carbon-based filler is preferably not greater than 50% by weight, more preferably not greater than 40% by weight, and particularly preferably not greater than 30% by weight, of the total amount of the carbon-based filler.

Examples of preferable base rubbers include natural rubbers, polybutadienes, polyisoprenes, styrene-butadiene copolymers, acrylonitrile-butadiene rubbers, polychloroprenes, ethylene-propylene copolymers, ethylene-propylene-diene copolymers, isobutylene-isoprene copolymers, and acrylic rubbers. More preferable base rubbers are natural rubbers and polybutadienes. As the base rubber, two or more types may be used in combinations.

In the case where a natural rubber and a polybutadiene are used in combination, in light of feel at impact, the weight ratio B/N of the amount B of the polybutadiene rubber to the amount N of the natural rubber is preferably not greater than 1.4, more preferably not greater than 1.0, and particularly preferably not greater than 0.4. The entire base rubber may be a natural rubber.

The rubber composition can further include a vulcanizing agent, a vulcanization accelerator, and a vulcanization aid. Examples of the vulcanizing agent include: sulfurs such as powdery sulfur, insoluble sulfur, precipitated sulfur, colloidal sulfur, and the like; and sulfur compounds such as morpholine disulfide, alkylphenol disulfide, and the like. The amount of the vulcanizing agent is adjusted in accordance with the type thereof. In light of resilience performance, the amount of the vulcanizing agent per 100 parts by weight of the base rubber is preferably not less than 0.5 parts by weight and more preferably not less than 1.0 part by weight. The amount of the vulcanizing agent is preferably not greater than 5.0 parts by weight.

Examples of suitable vulcanization accelerators include guanidine-based compounds, sulfenamide-based compounds, thiazole-based compounds, thiuram-based compounds, thiourea-based compounds, dithiocarbamic acid-based compounds, aldehyde-amine-based compounds, aldehyde-ammonia-based compounds, imidazoline-based compounds, and xanthate-based compounds. In light of resilience performance, the amount of the vulcanization accelerator per 100 parts by weight of the base rubber is preferably not less than 1.0 part by weight and more preferably not less than 2.0 parts by weight. The amount of the vulcanization accelerator is preferably not greater than 6.0 parts by weight.

Examples of the vulcanization aid include fatty acids such as stearic acid and the like, metal oxides such as zinc oxide and the like, fatty acid metal salts such as zinc stearate and the like. The rubber composition may further include additives such as an anti-aging agent, an antioxidant, a light stabilizer, a softener, a processing aid, a coloring agent, and the like as long as the advantageous effects of the present invention are not impaired.

Preferably, the rubber composition includes sulfur. The sulfur included in the rubber composition can contribute to formation of a crosslinked structure. The crosslinking density of the rubber composition influences the resilience performance and feel at impact of the hollow ball 2 obtained from this rubber composition. In light of resilience performance, the sulfur content of the rubber composition is preferably not less than 0.01% by weight, more preferably not less than 0.1% by weight, and particularly preferably not less than 1.0% by weight. In light of feel at impact, the sulfur content is preferably not greater than 10% by weight, more preferably not greater than 8% by weight, and particularly preferably not greater than 7% by weight. In the specification of the present application, the sulfur content of the rubber composition is the amount of sulfur element measured according to the oxygen flask combustion method described in GENERAL TESTS, PROCESSES AND APPARATUS in the Japanese Pharmacopoeia 17th Edition. The sulfur in the rubber composition may be sulfur as a single element, or may be sulfur atoms forming a sulfur compound. The sulfur may be derived from the vulcanizing agent or the vulcanization accelerator.

A nitrogen gas permeability coefficient $N_{2A}$ at 40° C. of the rubber composition is preferably not greater than $3.0\times10^{-9}$ ($cm^3 \cdot cm/cm^2/sec/cmHg$). The hollow ball 2 including the core 4 that is formed from the rubber composition having a nitrogen gas permeability coefficient $N_{2A}$ of not greater than $3.0\times10^{-9}$ ($cm^3 \cdot cm/cm^2/sec/cmHg$) has excellent durability. With the hollow ball 2, appropriate resilience performance and favorable feel at impact can be maintained. From this viewpoint, the nitrogen gas permeability coefficient $N_{2A}$ is more preferably not greater than $9.9\times10^{-10}$ ($cm^3 \cdot cm/cm^2/sec/cmHg$) and particularly preferably not greater than $7.0\times10^{-10}$ ($cm^3 \cdot cm/cm^2/sec/cmHg$).

Preferably, the nitrogen gas permeability coefficient $N_{2A}$ ($cm^3 \cdot cm/cm^2/sec/cmHg$) at 40° C. of the rubber composition satisfies the following formula (1).

$$N_{2A}/N_{2B} \leq 0.95 \qquad (1)$$

In formula (1), $N_{2B}$ is a nitrogen gas permeability coefficient ($cm^3 \cdot cm/cm^2/sec/cmHg$) at 40° C. of a rubber composition obtained by replacing the carbon-based filler having a degree of flatness DLc of not less than 50 with a carbon-based filler having a degree of flatness DLc of 1. In the specification of the present application, the nitrogen gas permeability coefficients $N_{2A}$ and $N_{2B}$ are measured according to the differential-pressure method described in JIS K7126-1. The measurement method will be described in detail later.

In the core 4 formed from the rubber composition that satisfies the above formula (1), leakage of gas is effectively reduced. With the hollow ball 2 including the core 4, appropriate resilience performance and favorable feel at impact can be maintained over a long period of time. From this viewpoint, the ratio $N_{2A}/N_{2B}$ of the nitrogen gas permeability coefficient $N_{2A}$ to the nitrogen gas permeability coefficient $N_{2B}$ is more preferably not greater than 0.85 and particularly preferably not greater than 0.75. The ratio $N_{2A}/N_{2B}$ is preferably not less than 0.01, more preferably not less than 0.05, and particularly preferably not less than 0.10.

In light of resilience performance, a Shore A hardness Ha of the rubber composition is preferably not less than 20, more preferably not less than 40, and particularly preferably not less than 50. In light of feel at impact, the hardness Ha is preferably not greater than 88, more preferably not greater than 85, and particularly preferably not greater than 80. The hardness Ha is measured with a type A durometer mounted to an automated hardness meter (trade name "digi test II" manufactured by Heinrich Bareiss Prüdfgerätebau GmbH). For the measurement, a slab that is formed by hot press and that has a thickness of about 2 mm is used. A slab kept at 23° C. for two weeks is used for the measurement. At the time of measurement, three slabs are stacked.

A loss tangent tan δ at 20° C. of the rubber composition correlates to the resilience performance of the hollow ball 2 including the core 4 that is formed from the rubber composition. From the viewpoint that appropriate resilience performance is achieved, the loss tangent tan δ at 20° C. of the rubber composition is preferably not greater than 1.0, more preferably not greater than 0.8, and particularly preferably not greater than 0.7. The loss tangent tan δ at 20° C. of the rubber composition is preferably not less than 0.05.

In light of resilience performance, the product (EB×Ha) of elongation at break EB (%) and the Shore A hardness Ha of the rubber composition is preferably not less than 1,000, more preferably not less than 2,000, and particularly preferably not less than 5,000. In light of feel at impact, the product (EB×Ha) is preferably not greater than 100,000, more preferably not greater than 80,000, and particularly preferably not greater than 50,000.

The elongation at break EB of the rubber composition is measured according to the description of JIS K6251 "Rubber, vulcanized or thermoplastics-Determination of tensile stress-strain properties". In light of resilience performance, the elongation at break EB of the rubber composition is preferably not less than 50%, more preferably not less than 100%, and particularly preferably not less than 300%. In light of feel at impact, the elongation at break EB is preferably not greater than 700%.

From the viewpoint of both resilience performance and feel at impact, the product (SW×Ha) of a toluene swelling ratio SW (%) and the Shore A hardness Ha of the rubber composition is preferably not less than 2,500, more preferably not less than 4,000, and particularly preferably not less than 6,000. From the same viewpoint, the product (SW×Ha) is preferably not greater than 50,000, more preferably not greater than 40,000, and particularly preferably not greater than 30,000.

The toluene swelling ratio SW of the rubber composition is measured according to the description of JIS K6258 "Rubber, vulcanized or thermoplastics-Determination of the effect of liquids". The toluene swelling ratio SW is an index for the crosslinking density of the rubber composition. In light of feel at impact, the toluene swelling ratio SW is preferably not less than 80%, more preferably not less than 90%, and particularly preferably not less than 100%. In light of resilience performance, the toluene swelling ratio SW is preferably not greater than 300%.

As long as the object of the present invention is achieved, the method for producing the rubber composition is not particularly limited. For example, the rubber composition may be produced by heating and pressing a kneaded product obtained by: putting the base rubber, the inorganic filler composed of a large number of flat particles, and the carbon-based filler having a degree of flatness DLc of not less than 50, other additives selected as appropriate, etc., into a known kneading machine such as a Banbury mixer, a kneader, a roll, or the like; and kneading these materials therein. The kneading conditions and the vulcanization conditions are selected on the basis of the formula of the rubber composition. The kneading temperature is preferably not lower than 50° C. and not higher than 180° C. The vulcanization temperature is preferably not lower than 140° C. and not higher than 180° C. The vulcanization time is preferably not shorter than 2 minutes and not longer than 60 minutes.

In light of reduction of the gas permeability coefficient, a preferable method for producing the rubber composition includes: a first step of mixing the base rubber and the carbon-based filler having a degree of flatness DLc of not less than 50 to obtain a master batch; and a second step of adding the inorganic filler composed of a large number of flat particles to the master batch. In this production method, in the first step, the carbon-based filler having strong interaction with the base rubber is added and mixed into the base rubber. In the master batch obtained thus, the large number of particles that form the carbon-based filler are uniformly dispersed. Since the inorganic filler is added to the master batch in the second step, the orientation of the large number of flat particles that form the inorganic filler is improved. In the production method, the order in which and the time at which the other additions other than the base rubber, the inorganic filler, and the carbon-based filler are blended are not particularly limited as long as the object of the present invention is achieved, and this order and this time are set as appropriate on the basis of the types of the other additives and the formula of the rubber composition.

The method for producing the hollow ball 2 by using the rubber composition is also not particularly limited. For example, two semi-spherical half shells are formed by vulcanizing and molding the rubber composition in a predetermined mold. The two half shells are attached to each other in a state where an ammonium salt and a nitrite are included in the interior thereof, and then compression molding is performed, whereby the core 4 that is a hollow sphere is formed. Within the core 4, nitrogen gas is generated by chemical reaction of the ammonium salt and the nitrite. By the nitrogen gas, the internal pressure of the core 4 is increased. Next, the felt portions 6 that have been cut in a dumbbell shape and have had seam glue adhered to the cut surfaces thereof are attached to the surface of the core 4, whereby the hollow ball 2 is obtained.

EXAMPLES

The following will show the effects of the present invention by means of Examples, but the present invention should not be construed in a limited manner on the basis of the description of these Examples.

Example 1

80 parts by weight of a natural rubber (trade name "SMR CV60"), 20 parts by weight of a polybutadiene rubber (trade name "BR01" of JSR Corporation), 15 parts by weight of a graphene (trade name "xGn-M-5" of XG Sciences, degree of flatness DLc: 700), 56 parts by weight of clay (trade name "ECKALITE 120" of IMERYS, degree of flatness DLi: 20), 5 parts by weight of silica (trade name "Nipsil VN3" of Tosoh Silica Corporation, degree of flatness DLi: 1), 5 parts by weight of zinc oxide (trade name "Zinc Oxide II" of SEIDO CHEMICAL INDUSTRY CO., LTD., degree of flatness DLi: 1), and 0.5 parts by weight of stearic acid (trade name "Tsubaki" of NOF Corporation) were put into a Banbury mixer and kneaded at 90° C. for 5 minutes therein. 3.6 parts by weight of sulfur (trade name "Sanfel EX" of SANSHIN CHEMICAL INDUSTRY CO., LTD., containing 20% of oil), 1 part by weight of a vulcanization accelerator DPG (trade name "Sanceler D" of SANSHIN CHEMICAL INDUSTRY CO., LTD.), 1 part by weight of a vulcanization accelerator CZ (trade name "Nocceler CZ" of Ouchi Shinko Chemical Industrial Co., Ltd.), and 1.9 parts by weight of a vulcanization accelerator DM (trade name "Nocceler DM" of Ouchi Shinko Chemical Industrial Co., Ltd.) were added to the obtained kneaded product, and the mixture was kneaded at 50° C. for 3 minutes using an open roll, whereby a rubber composition of Example 1 was obtained.

Examples 2 to 13 and Comparative Examples 1 to 20

Rubber compositions of Examples 2 to 13 and Comparative Examples 1 to 20 were obtained in the same manner as Example 1, except the type and the amount of the filler were changed to those shown in Tables 1 to 7.

Example 14

80 parts by weight of a natural rubber (trade name "SMR CV60"), 20 parts by weight of a polybutadiene rubber (trade name "BR01" of JSR Corporation), and 15 parts by weight of a graphene (trade name "xGn-M-5" of XG Sciences, degree of flatness DLc: 700) were put into a Banbury mixer and kneaded at 90° C. for 5 minutes therein to obtain a master batch. Next, 56 parts by weight of clay (trade name "ECKALITE 120" of IMERYS, degree of flatness DLi: 20), 5 parts by weight of silica (trade name "Nipsil VN3" of Tosoh Silica Corporation, degree of flatness DLi: 1), 5 parts by weight of zinc oxide (trade name "Zinc Oxide II" of SEIDO CHEMICAL INDUSTRY CO., LTD., degree of flatness DLi: 1), and 0.5 parts by weight of stearic acid (trade name "Tsubaki" of NOF Corporation) were added to the master batch, and the mixture was kneaded at 90° C. for 5 minutes. 3.6 parts by weight of sulfur (trade name "Sanfel EX" of SANSHIN CHEMICAL INDUSTRY CO., LTD., containing 20% of oil), 1 part by weight of a vulcanization accelerator DPG (trade name "Sanceler D" of SANSHIN CHEMICAL INDUSTRY CO., LTD.), 1 part by weight of a vulcanization accelerator CZ (trade name "Nocceler CZ" of Ouchi Shinko Chemical Industrial Co., Ltd.), and 1.9 parts by weight of a vulcanization accelerator DM (trade name "Nocceler DM" of Ouchi Shinko Chemical Industrial Co., Ltd.) were added to the obtained kneaded product, and the mixture was kneaded at 50° C. for 3 minutes using an open roll, whereby a rubber composition of Example 14 was obtained.

TABLE 1

Formula of Rubber Composition (parts by weight)

| | Ex. 1 | Ex. 2 | Com. Ex. 1 | Com. Ex. 2 | Com. Ex. 3 |
|---|---|---|---|---|---|
| SMR CV60 | 80 | 80 | 80 | 80 | 80 |
| BR01 | 20 | 20 | 20 | 20 | 20 |
| Carbon-based filler | | | | | |
| Graphene (DLc700) | 15 | 0 | 0 | 0 | 0 |
| Graphite (DLc110) | 0 | 15 | 0 | 0 | 0 |
| Carbon black (DLc1) | 0 | 0 | 15 | 0 | 0 |
| Inorganic filler | | | | | |
| Clay (DLi20) | 56 | 56 | 56 | 71 | 56 |
| Talc (DLi30) | 0 | 0 | 0 | 0 | 0 |
| Mica (DLi90) | 0 | 0 | 0 | 0 | 15 |
| Silica (DLi1) | 5 | 5 | 5 | 5 | 5 |
| Zinc oxide (DLi1) | 5 | 5 | 5 | 5 | 5 |
| Stearic acid | 0.5 | 0.5 | 0.5 | 0.5 | 0.5 |
| Sulfur | 3.6 | 3.6 | 3.6 | 3.6 | 3.6 |
| Vulcanization accelerator DPG | 1 | 1 | 1 | 1 | 1 |
| Vulcanization accelerator CZ | 1 | 1 | 1 | 1 | 1 |
| Vulcanization accelerator DM | 1.9 | 1.9 | 1.9 | 1.9 | 1.9 |

TABLE 2

Formula of Rubber Composition (parts by weight)

| | Com. Ex. 4 | Ex. 3 | Com. Ex. 5 | Com. Ex. 6 |
|---|---|---|---|---|
| SMR CV60 | 80 | 80 | 80 | 80 |
| BR01 | 20 | 20 | 20 | 20 |
| Carbon-based filler | | | | |
| Graphene (DLc700) | 65 | 56 | 0 | 0 |
| Graphite (DLc110) | 0 | 0 | 0 | 0 |
| Carbon black (DLc1) | 0 | 0 | 0 | 56 |
| Inorganic filler | | | | |
| Clay (DLi20) | 56 | 56 | 112 | 56 |
| Talc (DLi30) | 0 | 0 | 0 | 0 |
| Mica (DLi90) | 0 | 0 | 0 | 0 |
| Silica (DLi1) | 5 | 5 | 5 | 5 |
| Zinc oxide (DLi1) | 5 | 5 | 5 | 5 |
| Stearic acid | 0.5 | 0.5 | 0.5 | 0.5 |
| Sulfur | 3.6 | 3.6 | 3.6 | 3.6 |
| Vulcanization accelerator DPG | 1 | 1 | 1 | 1 |
| Vulcanization accelerator CZ | 1 | 1 | 1 | 1 |
| Vulcanization accelerator DM | 1.9 | 1.9 | 1.9 | 1.9 |

TABLE 3

Formula of Rubber Composition (parts by weight)

| | Ex.4 | Com. Ex.7 | Com. Ex.8 | Ex.5 | Com. Ex.9 | Com. Ex.10 |
|---|---|---|---|---|---|---|
| SMR CV60 | 80 | 80 | 80 | 80 | 80 | 80 |
| BR01 | 20 | 20 | 20 | 20 | 20 | 20 |
| Carbon-based filler | | | | | | |
| Graphene (DLc700) | 2 | 0 | 0 | 3 | 0 | 0 |
| Graphite (DLc110) | 0 | 0 | 0 | 0 | 0 | 0 |
| Carbon black (DLc1) | 0 | 0 | 2 | 0 | 0 | 3 |
| Inorganic filler | | | | | | |
| Clay (DLi20) | 56 | 58 | 56 | 20 | 23 | 20 |
| Talc (DLi30) | 0 | 0 | 0 | 0 | 0 | 0 |
| Mica (DLi90) | 0 | 0 | 0 | 0 | 0 | 0 |
| Silica (DLi1) | 5 | 5 | 5 | 5 | 5 | 5 |
| Zinc oxide (DLi1) | 5 | 5 | 5 | 5 | 5 | 5 |
| Stearic acid | 0.5 | 0.5 | 0.5 | 0.5 | 0.5 | 0.5 |
| Sulfur | 3.6 | 3.6 | 3.6 | 3.6 | 3.6 | 3.6 |
| Vulcanization accelerator DPG | 1 | 1 | 1 | 1 | 1 | 1 |
| Vulcanization accelerator CZ | 1 | 1 | 1 | 1 | 1 | 1 |
| Vulcanization accelerator DM | 1.9 | 1.9 | 1.9 | 1.9 | 1.9 | 1.9 |

TABLE 4

Formula of Rubber Composition (parts by weight)

| | Ex.6 | Com. Ex.11 | Com. Ex.12 | Ex.7 | Com. Ex.13 | Com. Ex.14 |
|---|---|---|---|---|---|---|
| SMR CV60 | 80 | 80 | 80 | 80 | 80 | 80 |
| BR01 | 20 | 20 | 20 | 20 | 20 | 20 |
| Carbon-based filler | | | | | | |
| Graphene (DLc700) | 15 | 0 | 0 | 23 | 0 | 0 |
| Graphite (DLc110) | 0 | 0 | 0 | 0 | 0 | 0 |
| Carbon black (DLc1) | 0 | 0 | 15 | 0 | 0 | 23 |
| Inorganic filler | | | | | | |
| Clay (DLi20) | 100 | 115 | 100 | 150 | 173 | 150 |
| Talc (DLi30) | 0 | 0 | 0 | 0 | 0 | 0 |
| Mica (DLi90) | 0 | 0 | 0 | 0 | 0 | 0 |
| Silica (DLi1) | 5 | 5 | 5 | 5 | 5 | 5 |
| Zinc oxide (DLi1) | 5 | 5 | 5 | 5 | 5 | 5 |
| Stearic acid | 0.5 | 0.5 | 0.5 | 0.5 | 0.5 | 0.5 |
| Sulfur | 3.6 | 3.6 | 3.6 | 3.6 | 3.6 | 3.6 |
| Vulcanization accelerator DPG | 1 | 1 | 1 | 1 | 1 | 1 |
| Vulcanization accelerator CZ | 1 | 1 | 1 | 1 | 1 | 1 |
| Vulcanization accelerator DM | 1.9 | 1.9 | 1.9 | 1.9 | 1.9 | 1.9 |

TABLE 5

Formula of Rubber Composition (parts by weight)

| | Ex.8 | Com. Ex.15 | Com. Ex.16 | Ex.9 | Com. Ex.17 | Com. Ex.18 |
|---|---|---|---|---|---|---|
| SMR CV60 | 80 | 80 | 80 | 80 | 80 | 80 |
| BR01 | 20 | 20 | 20 | 20 | 20 | 20 |
| Carbon-based filler | | | | | | |
| Graphene (DLc700) | 15 | 0 | 0 | 15 | 0 | 0 |
| Graphite (DLc110) | 0 | 0 | 0 | 0 | 0 | 0 |
| Carbon black (DLc1) | 0 | 0 | 15 | 0 | 0 | 15 |

TABLE 5-continued

Formula of Rubber Composition (parts by weight)

| | Ex.8 | Com. Ex.15 | Com. Ex.16 | Ex.9 | Com. Ex.17 | Com. Ex.18 |
|---|---|---|---|---|---|---|
| Inorganic filler | | | | | | |
| Clay (DLi20) | 0 | 0 | 0 | 0 | 0 | 0 |
| Talc (DLi30) | 56 | 71 | 56 | 0 | 0 | 0 |
| Mica (DLi90) | 0 | 0 | 0 | 56 | 71 | 56 |
| Silica (DLi1) | 5 | 5 | 5 | 5 | 5 | 5 |
| Zinc oxide (DLi1) | 5 | 5 | 5 | 5 | 5 | 5 |
| Stearic acid | 0.5 | 0.5 | 0.5 | 0.5 | 0.5 | 0.5 |
| Sulfur | 3.6 | 3.6 | 3.6 | 3.6 | 3.6 | 3.6 |
| Vulcanization accelerator DPG | 1 | 1 | 1 | 1 | 1 | 1 |
| Vulcanization accelerator CZ | 1 | 1 | 1 | 1 | 1 | 1 |
| Vulcanization accelerator DM | 1.9 | 1.9 | 1.9 | 1.9 | 1.9 | 1.9 |

TABLE 6

Formula of Rubber Composition (parts by weight)

| | Ex. 10 | Ex. 11 | Ex. 12 | Com. Ex. 19 |
|---|---|---|---|---|
| SMR CV60 | 80 | 80 | 80 | 80 |
| BR01 | 20 | 20 | 20 | 20 |
| Carbon-based filler | | | | |
| Graphene (DLc700) | 15 | 15 | 27 | 0 |
| Graphite (DLc110) | 0 | 0 | 0 | 0 |
| Carbon black (DLc1) | 0 | 0 | 0 | 27 |
| Inorganic filler | | | | |
| Clay (DLi20) | 56 | 56 | 180 | 180 |
| Talc (DLi30) | 0 | 0 | 0 | 0 |
| Mica (DLi90) | 0 | 0 | 0 | 0 |
| Silica (DLi1) | 5 | 5 | 5 | 5 |
| Zinc oxide (DLi1) | 5 | 5 | 5 | 5 |
| Stearic acid | 0.5 | 0.5 | 0.5 | 0.5 |
| Sulfur | 1.5 | 12 | 3.6 | 3.6 |
| Vulcanization accelerator DPG | 0.5 | 2 | 1 | 1 |
| Vulcanization accelerator CZ | 0.5 | 4 | 1 | 1 |
| Vulcanization accelerator DM | 0.9 | 4 | 1.9 | 1.9 |

TABLE 7

Formula of Rubber Composition (parts by weight)

| | Ex. 13 | Com. Ex. 20 | Ex. 14 |
|---|---|---|---|
| SMR CV60 | 50 | 50 | 80 |
| BR01 | 50 | 50 | 20 |
| Carbon-based filler | | | |
| Graphene (DLc700) | 15 | 0 | 15 |
| Graphite (DLc110) | 0 | 0 | 0 |
| Carbon black (DLc1) | 0 | 15 | 0 |
| Inorganic filler | | | |
| Clay (DLi20) | 56 | 56 | 56 |
| Talc (DLi30) | 0 | 0 | 0 |
| Mica (DLi90) | 0 | 0 | 0 |
| Silica (DLi1) | 5 | 5 | 5 |
| Zinc oxide (DLi1) | 5 | 5 | 5 |
| Stearic acid | 0.5 | 0.5 | 0.5 |
| Sulfur | 3.6 | 3.6 | 3.6 |
| Vulcanization accelerator DPG | 1 | 1 | 1 |
| Vulcanization accelerator CZ | 1 | 1 | 1 |
| Vulcanization accelerator DM | 1.9 | 1.9 | 1.9 |

The details of the compounds listed in Tables 1 to 7 are as follows.

SMR CV60: a natural rubber

BR01: a polybutadiene rubber of JSR Corporation

Graphene (DLc700): trade name "xGnP-M-5" of XG Sciences, average particle diameter ($D_{50}{}^c$): 5 µm, average thickness (Tc): 0.007 µm, degree of flatness (DLc): 700

Graphite (DLc110): trade name "SFG44" of IMERYS, average particle diameter ($D_{50}{}^c$): 49 µm, average thickness (Tc): 0.45 µm, degree of flatness (DLc): 110

Carbon black (DLc1): trade name "Show Black N330" of Cabot Japan K.K., average particle diameter ($D_{50}{}^c$): 0.03 µm, degree of flatness (DLc): 1

Clay (DLi20): kaolin clay, trade name "ECKALITE 120", of IMERYS, average particle diameter ($D_{50}{}^i$): 4 µm, average thickness (Ti): 0.2 µm, degree of flatness (DLi): 20

Talc (DLi30): trade name "K-1" of Nippon Talc Co., Ltd., average particle diameter ($D_{50}{}^i$): 8 µm, average thickness (Ti): 0.27 µm, degree of flatness (DLi): 30

Mica (DLi90): trade name "SYA-21" of YAMAGUCHI MICA CO., LTD., average particle diameter ($D_{50}{}^i$): 27 µm, average thickness (Ti): 0.3 µm, degree of flatness (DLi): 90

Silica (DLi1): trade name "Nipsil VN3" of Tosoh Silica Corporation, average particle diameter ($D_{50}{}^i$): 20 µm, degree of flatness (DLi): 1

Zinc oxide (DLi1): trade name "Zinc Oxide II" of SEIDO CHEMICAL INDUSTRY CO., LTD., average particle diameter ($D_{50}{}^i$): 0.6 µm, degree of flatness (DLi): 1

Stearic acid: trade name "Tsubaki" of NOF Corporation

Sulfur: insoluble sulfur, trade name "Sanfel EX", of SANSHIN CHEMICAL INDUSTRY CO., LTD., containing 20% of oil Vulcanization accelerator DPG: 1,3-diphenylguanidine, trade name "Sanceler D", of SANSHIN CHEMICAL INDUSTRY CO., LTD.

Vulcanization accelerator CZ: N-cyclohexyl-2-benzothiazolyl sulfenamide, trade name "Nocceler CZ", of Ouchi Shinko Chemical Industrial Co., Ltd.

Vulcanization accelerator DM: di-2-benzothiazolyl disulfide, trade name "Nocceler DM", of Ouchi Shinko Chemical Industrial Co., Ltd.

[Scanning Electron Microscopy]

Figure 2A:
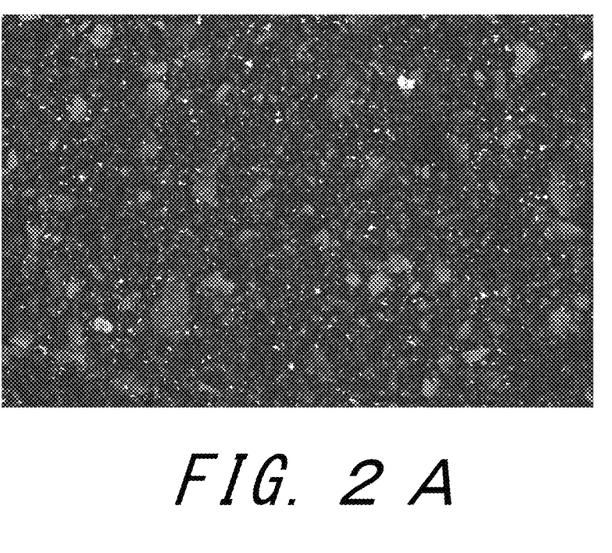
FIG. 2A is an SEM picture of a test piece formed from a rubber composition of Example 1 and is an image of the test piece as observed in the vertical direction.
Figure 2B:
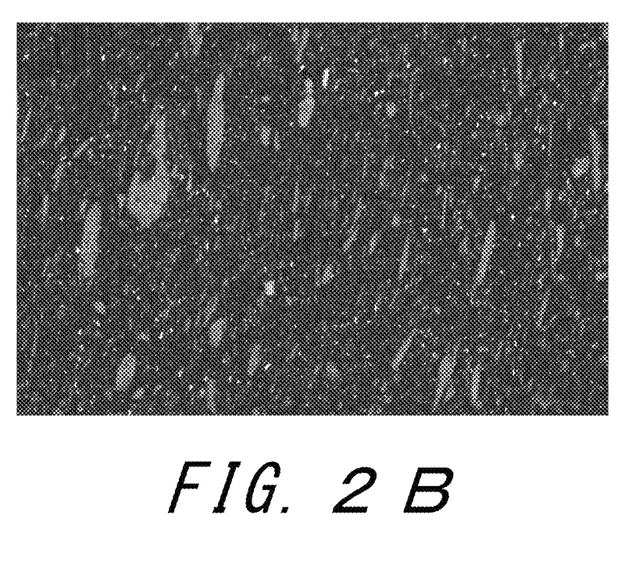
FIG. 2B is an SEM picture of the test piece formed from the rubber composition of Example 1 and is an image of the test piece as observed in the horizontal direction.
Figure 3A:
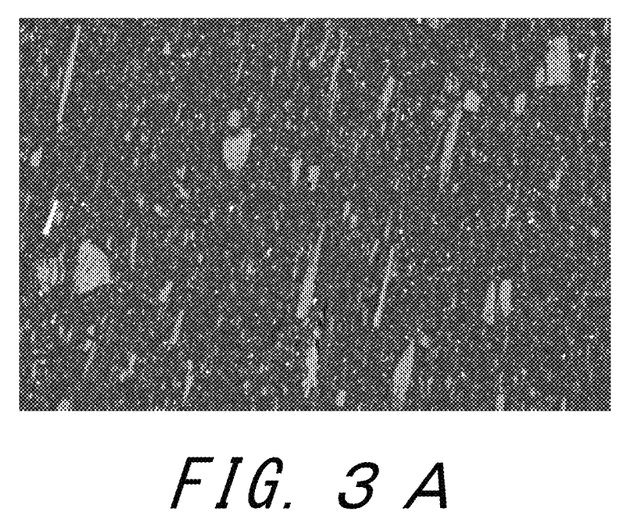
FIG. 3A is an SEM picture of a test piece formed from a rubber composition of Comparative Example 1 and is an image of the test piece as observed in the vertical direction.
Figure 3B:
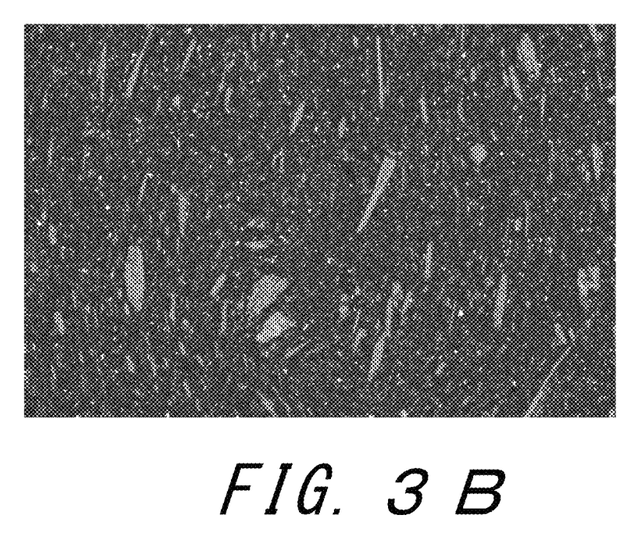
FIG. 3B is an SEM picture of the test piece formed from the rubber composition of Comparative Example 1 and is an image of the test piece as observed in the horizontal direction.

Each of the plate-shaped test pieces was produced by placing each of the rubber compositions of Example 1 and Comparative Example 1 into a mold and press-vulcanizing each of the rubber compositions at 160° C. for 2 minutes. The upper surface and the side surface of the obtained test pieces were cut with a cryotome and observed using a scanning electron microscope (XL-30 manufactured by Koninklijke Philips N.V.). The result obtained for Example 1 is shown in FIGS. 2A and 2B. The result obtained for Comparative Example 1 is shown in FIGS. 3A and 3B. FIGS. 2A and 3A are SEM pictures obtained by observing the respective test pieces from above in the vertical direction. FIGS. 2B and 3B are SEM pictures obtained by observing the respective test pieces in the horizontal direction.

In FIGS. 2A and 2B and FIGS. 3A and 3B, clay particles having a flat shape and included in the rubber compositions are shown as white portions. The graphene included in the rubber composition of Example 1 has a density close to that of the base rubber, and thus is not observed in the SEM image.

As shown in FIGS. 2A and 2B, in the rubber composition of Example 1, the dispersed state of the clay particles is different depending on the direction of observation. This result demonstrates that, in the rubber composition of Example 1, the long axis directions of the flat clay particles are oriented parallel to the vertical direction of the test piece. Meanwhile, in the rubber composition of Comparative Example 1, as shown in FIGS. 3A and 3B, the dispersed state of the clay particles is similar in any of the directions of observation. This result demonstrates that, in the rubber composition of Comparative Example 1, the clay particles are dispersed so as to be directed in random directions.

[Gas Permeability Coefficient Measurement]

Three test pieces each having a thickness of 2 mm, a width of 50 mm, and a length of 50 mm were prepared by placing each of the rubber compositions of Examples 1 to 14 and Comparative Examples 1 to 20 into a mold and press-vulcanizing the rubber compositions at 160° C. for 2 minutes, respectively. Each test piece was kept at 23° C. for 2 weeks. A nitrogen gas permeability coefficient ($cm^3 \cdot cm/cm^2/sec/cmHg$) of each test piece in the thickness direction thereof was measured according to the differential-pressure method described in JIS K7126-1. For the measurement, gas permeation tester "GTR-30ANI" manufactured by GTR TEC Corporation was used. The measurement conditions were: sample temperature: 40° C., transmission cross-sectional area of a measurement cell: 15.2 $cm^2$, and differential pressure: 0.2 MPa. All the measurements were carried out indoor at 23±0.5° C. The nitrogen gas permeability coefficients obtained for the rubber compositions of Examples 1 to 14 and Comparative Examples 2 to 5, 7, 9, 11, 13, 15, and 17 are shown as $N_{2A}$ in Tables 8 to 14 below. The nitrogen gas permeability coefficients obtained for the rubber compositions of Comparative Examples 1, 6, 8, 10, 12, 14, 16, and 18 to 20 are shown as $N_{2B}$ in Tables 8 to 14 below. $N_{2A}/N_{2B}$ shown in Tables 8 to 14 below is the ratios of $N_{2A}$ obtained for Examples 1 to 14 to $N_{2B}$ of the Comparative Examples obtained by replacing the carbon-based fillers having DLc of not less than 50 included in Examples 1 to 14 with carbon black having DLc of 1.

[Sulfur Content Measurement]

The sulfur contents of the rubber compositions of Examples 1 to 14 and Comparative Examples 1 to 20 were measured according to the oxygen flask combustion method described in GENERAL TESTS, PROCESSES AND APPARATUS in the Japanese Pharmacopoeia 17th Edition. After 10 mg of each rubber composition was burnt, 55 ml of methanol was added in total, and then 20 ml of a 0.005-mol/l perchloric acid solution was precisely added. The resultant solution was allowed to stand for 10 minutes, and a sulfur content was determined by measuring the obtained solution using ion chromatography (HIC-SP, manufactured by Shimadzu Corporation). The obtained sulfur content (wt. %) is shown in Tables 8 to 14.

[Hardness]

Three test pieces each having a thickness of 2 mm, a width of 4 mm, and a length of 30 mm were prepared by placing each of the rubber compositions of Examples 1 to 14 and Comparative Examples 1 to 20 into a mold and press-vulcanizing the rubber compositions at 160° C. for 2 minutes, respectively. Each test piece was kept at 23° C. for 2 weeks. Thereafter, hardness was measured by pressing an automated hardness meter (the aforementioned "digi test II"), to which a type A durometer was mounted, to three stacked test pieces of each rubber composition according to the standard of "ASTM-D 2240-68". The obtained Shore A hardness is shown as Ha in Tables 8 to 14 below.

[Elongation at Break]

The No. 3 dumbbell type test pieces each having a thickness of 2 mm was produced by placing each of the rubber compositions of Examples 1 to 14 and Comparative Examples 1 to 20 into a mold and press-vulcanizing the rubber compositions at 160° C. for 2 minutes, respectively. A tensile test was carried out at room temperature according to the description of JIS K6251 "Rubber, vulcanized or thermoplastics-Determination of tensile stress-strain properties" to measure elongation at break of each test piece. The obtained measurement value is shown as EB (%) in Tables 8 to 14 below.

[Toluene Swelling Ratio]

The test pieces each having a thickness of 0.5 mm, a length of 10 mm, and a width of 5 mm was prepared by placing each of the rubber compositions of Examples 1 to 14 and Comparative Examples 1 to 20 into a mold and press-vulcanizing the rubber compositions at 160° C. for 2 minutes, respectively. Each test piece was immersed in toluene at room temperature for 24 hours, and a toluene swelling ratio (weight change rate (%)=weight after immersion/weight before immersion) was calculated from the weight change of the test piece before and after the immersion. The obtained toluene swelling ratio is shown as SW (%) in Tables 8 to 14 below.

[Viscoelasticity Measurement]

The test pieces each having a thickness of 2 mm, a width of 4 mm, and a length of 30 mm was prepared by placing each of the rubber compositions of Examples 1 to 14 and Comparative Examples 1 to 20 into a mold and press-vulcanizing the rubber compositions at 160° C. for 2 minutes, respectively. A loss tangent at 0° C. of each test piece was measured using a viscoelasticity spectrometer (E4000 manufactured by UBM Co.) in a tensile mode, at an initial strain of 10%, at a frequency of 10 Hz, and with an amplitude of 0.05%. The obtained loss tangent is shown as tan δ in Tables 8 to 14 below.

[Production of Tennis Ball]

Two half shells were formed by placing an unvulcanized rubber composition obtained in the same manner as in Example 1, into a mold, and heating the rubber composition at 150° C. for 4 minutes. A spherical core was formed by putting ammonium chloride, sodium nitrite, and water into one of the half shells, then bonding the half shell to the other half shell, and heating the half shells at 150° C. for 4 minutes. Two felt portions having seam glue adhered to the cut surfaces thereof were attached to the surface of the core, whereby a tennis ball was produced. Similarly, tennis balls having cores formed from the rubber compositions of Examples 2 to 14 and Comparative Examples 1 to 20, respectively, were produced.

[Durability]

Each of the obtained tennis balls was allowed to stand under the atmospheric pressure in an environment having an air temperature of 20° C. and a relative humidity of 60% for 24 hours, and the internal pressure of the tennis ball (the difference from the atmospheric pressure) was measured. The same tennis ball was further kept under the atmospheric pressure for 3 months, and the internal pressure thereof was measured. The reduction rate of the internal pressure before and after the elapse of 3 months was calculated, and the durability was evaluated on the basis of the following criteria. The results are shown in Tables 8 to 14 below.

S: less than 10%
A: not less than 10% and less than 20%
B: not less than 20% and less than 30%
C: not less than 30%

[Feel at Impact]

50 players hit, with tennis rackets, each tennis ball allowed to stand under the atmospheric pressure in an environment having an air temperature of 20° C. and a relative humidity of 60% for 24 hours after the production, and were asked about feel at impact. The evaluation was categorized as follows on the basis of the number of players who answered, "the feel at impact was good". The results are shown in Tables 8 to 14 below.

S: 40 persons or more
A: 30 to 39 persons
B: 20 to 29 persons
C: 19 persons or less

TABLE 8

Results of Evaluation

| | Ex. 1 | Ex. 2 | Com. Ex. 1 | Com. Ex. 2 | Com. Ex. 3 |
|---|---|---|---|---|---|
| Mc (DLc ≥ 50) (phr) | 15 | 15 | 0 | 0 | 0 |
| Mi (DLi ≥ 5) (phr) | 56 | 56 | 56 | 71 | 71 |
| Sum (Mc + Ci) | 71 | 71 | 56 | 71 | 71 |
| Ratio (Mo/Mi) | 0.27 | 0.27 | 0 | 0 | 0 |
| Sulfur content (wt. %) | 2.04 | 2.04 | 2.04 | 2.04 | 2.04 |
| Ratio B/N | 0.25 | 0.25 | 0.25 | 0.25 | 0.25 |
| $N_{2A}$ (×10$^{-10}$) | 6.21 | 6.90 | — | 8.84 | 8.76 |
| $N_{2B}$ (×10$^{-10}$) | — | — | 9.27 | — | — |
| $N_{2A}/N_{2B}$ | 0.67 | 0.74 | — | — | — |
| Ha (shore A) | 75 | 73 | 72 | 70 | 68 |
| EB (%) | 427 | 433 | 417 | 468 | 472 |
| SW (%) | 187 | 191 | 219 | 221 | 226 |
| tanδ (20° C.) | 0.065 | 0.065 | 0.048 | 0.034 | 0.031 |
| EB × Ha | 32025 | 31609 | 30024 | 32760 | 32096 |
| SW × Ha | 14025 | 13943 | 15768 | 15470 | 15368 |
| Ball performance | | | | | |
| Durability | S | S | B | B | B |
| Feel at impact | S | S | A | A | A |

TABLE 9

Results of Evaluation

| | Com. Ex. 4 | Ex. 3 | Com. Ex. 5 | Com. Ex. 6 |
|---|---|---|---|---|
| Mc (DLc ≥ 50) (phr) | 65 | 56 | 0 | 0 |
| Mi (DLi ≥ 5) (phr) | 56 | 56 | 112 | 56 |
| Sum (Mc + Ci) | 121 | 112 | 112 | 56 |
| Ratio (Mc/Mi) | 1.16 | 1.00 | 0 | 0 |
| Sulfur content (wt. %) | 1.61 | 1.68 | 1.68 | 1.68 |
| Ratio B/N | 0.25 | 0.25 | 0.25 | 0.25 |
| $N_{2A}$ (×10$^{-10}$) | 2.25 | 2.49 | 3.81 | — |
| $N_{2B}$ (×10$^{-10}$) | — | — | — | 9.57 |
| $N_{2A}/N_{2B}$ | — | 0.26 | — | — |
| Ha (shore A) | 87 | 83 | 80 | 81 |
| EB (%) | 164 | 179 | 209 | 182 |
| SW (%) | 145 | 148 | 177 | 163 |
| tanδ (20° C.) | 0.084 | 0.077 | 0.053 | 0.068 |
| EB × Ha | 14268 | 14857 | 16720 | 14742 |
| SW × Ha | 12615 | 12284 | 14160 | 13203 |
| Ball performance | | | | |
| Durability | A | S | A | B |
| Feel at impact | C | A | A | A |

TABLE 10

Results of Evaluation

| | Ex.4 | Com. Ex.7 | Com. Ex.8 | Ex.5 | Com. Ex.9 | Com. Ex.10 |
|---|---|---|---|---|---|---|
| Mc (DLc ≥ 50) (phr) | 2 | 0 | 0 | 3 | 0 | 0 |
| Mi (DLi ≥ 5) (phr) | 56 | 58 | 56 | 20 | 23 | 20 |
| Sum (Mc + Ci) | 58 | 58 | 56 | 23 | 23 | 23 |
| Ratio (Mc/Mi) | 0.04 | 0 | 0 | 0.15 | 0 | 0 |
| Sulfur content (wt. %) | 2.19 | 2.19 | 2.19 | 2.73 | 2.73 | 2.73 |
| Ratio B/N | 0.25 | 0.25 | 0.25 | 0.25 | 0.25 | 0.25 |
| $N_{2A}$ (×10$^{-10}$) | 9.79 | 11.9 | — | 2.54 | 47.3 | — |
| $N_{2B}$ (×10$^{-10}$) | — | — | 12.1 | — | — | 48.8 |
| $N_{2A}/N_{2B}$ | 0.81 | — | — | 0.52 | — | — |
| Ha (shore A) | 64 | 64 | 64 | 51 | 49 | 51 |
| EB (%) | 448 | 457 | 451 | 486 | 488 | 484 |
| SW (%) | 256 | 254 | 254 | 248 | 244 | 249 |
| tanδ (20° C.) | 0.034 | 0.031 | 0.035 | 0.053 | 0.024 | 0.049 |
| EB × Ha | 28672 | 29248 | 28864 | 24786 | 23912 | 24684 |
| SW × Ha | 16384 | 16256 | 16256 | 12648 | 11956 | 12699 |
| Ball performance | | | | | | |
| Durability | A | B | B | B | C | C |
| Feel at impact | A | A | A | A | A | A |

TABLE 11

Results of Evaluation

| | Ex.6 | Com. Ex.11 | Com. Ex.12 | Ex.7 | Com. Ex.13 | Com. Ex.14 |
|---|---|---|---|---|---|---|
| Mc (DLc ≥ 50) (phr) | 15 | 0 | 0 | 23 | 0 | 0 |
| Mi (DLi ≥ 5) (phr) | 100 | 115 | 100 | 150 | 173 | 150 |
| Sum (Mc + Ci) | 115 | 115 | 100 | 173 | 173 | 150 |
| Ratio (Mc/Mi) | 0.15 | 0 | 0 | 0.15 | 0 | 0 |
| Sulfur content (wt. %) | 1.65 | 1.65 | 1.65 | 1.32 | 1.32 | 1.32 |
| Ratio B/N | 0.25 | 0.25 | 0.25 | 0.25 | 0.25 | 0.25 |
| $N_{2A}$ (×10$^{-10}$) | 3.17 | 3.75 | — | 2.84 | 3.27 | — |
| $N_{2B}$ (×10$^{-10}$) | — | — | 3.83 | — | — | 3.4 |
| $N_{2A}/N_{2B}$ | 0.83 | — | — | 0.84 | — | — |
| Ha (shore A) | 85 | 81 | 84 | 88 | 84 | 88 |
| EB (%) | 124 | 128 | 127 | 85 | 92 | 88 |

TABLE 11-continued

Results of Evaluation

|  | Ex.6 | Com. Ex.11 | Com. Ex.12 | Ex.7 | Com. Ex.13 | Com. Ex.14 |
|---|---|---|---|---|---|---|
| SW (%) | 174 | 181 | 162 | 134 | 131 | 134 |
| tanδ (20° C.) | 0.071 | 0.047 | 0.065 | 0.078 | 0.059 | 0.081 |
| EB × Ha | 10540 | 10368 | 10668 | 7480 | 7728 | 7744 |
| SW × Ha | 14790 | 14661 | 13608 | 11792 | 11004 | 11792 |
| Ball performance | | | | | | |
| Durability | S | A | A | S | A | A |
| Feel at impact | A | A | B | B | B | B |

TABLE 12

Results of Evaluation

|  | Ex.8 | Com. Ex.15 | Com. Ex.16 | Ex.9 | Com. Ex.17 | Com. Ex.18 |
|---|---|---|---|---|---|---|
| Mc (DLc ≥ 50) (phr) | 15 | 0 | 0 | 15 | 0 | 0 |
| Mi (DLi ≥ 5) (phr) | 56 | 71 | 56 | 56 | 71 | 56 |
| Sum (Mc + Ci) | 71 | 71 | 56 | 71 | 71 | 56 |
| Ratio (Mc/Mi) | 0.27 | 0 | 0 | 0.27 | 0 | 0 |
| Sulfur content (wt. %) | 2.04 | 2.04 | 2.04 | 2.04 | 2.04 | 2.04 |
| Ratio B/N | 0.25 | 0.25 | 0.25 | 0.25 | 0.25 | 0.25 |
| $N_{2A}$ (×10$^{-10}$) | 5.99 | 8.42 | — | 5.68 | 7.51 | — |
| $N_{2B}$ (×10$^{-10}$) | — | — | 8.81 | — | — | 8.03 |
| $N_{2A}/N_{2B}$ | 0.68 | — | — | 0.71 | — | — |
| Ha (shore A) | 78 | 73 | 77 | 77 | 72 | 77 |
| EB (%) | 337 | 378 | 324 | 345 | 361 | 352 |
| SW (%) | 191 | 201 | 188 | 175 | 198 | 164 |
| tanδ (20° C.) | 0.071 | 0.057 | 0.061 | 0.064 | 0.044 | 0.071 |
| EB × Ha | 26286 | 27594 | 24948 | 26565 | 25992 | 27104 |
| SW × Ha | 14898 | 14673 | 14476 | 13475 | 14256 | 12628 |
| Ball performance | | | | | | |
| Durability | S | A | A | S | A | A |
| Feel at impact | S | A | A | S | A | A |

TABLE 13

Results of Evaluation

|  | Ex. 10 | Ex. 11 | Ex. 12 | Com. Ex. 19 |
|---|---|---|---|---|
| Mc (DLc ≥ 50) (phr) | 15 | 15 | 27 | 0 |
| Mi (DLi ≥ 5) (phr) | 56 | 56 | 180 | 180 |
| Sum (Mc + Ci) | 71 | 71 | 207 | 180 |
| Ratio (Mc/Mi) | 0.27 | 0.27 | 0.15 | 0 |
| Sulfur content (wt. %) | 0.90 | 5.95 | 1.19 | 1.19 |
| Ratio B/N | 0.25 | 0.25 | 0.25 | 0.25 |
| $N_{2A}$ (×10$^{-10}$) | 7.02 | 6.76 | 2.56 | — |
| $N_{2B}$ (×10$^{-10}$) | — | — | — | 3.67 |
| $N_{2A}/N_{2B}$ | 0.76 | 0.73 | 0.70 | — |
| Ha (shore A) | 73 | 78 | 89 | 89 |
| EB (%) | 397 | 354 | 74 | 73 |
| SW (%) | 242 | 191 | 121 | 125 |
| tanδ (20° C.) | 0.077 | 0.069 | 0.105 | 0.094 |
| EB × Ha | 28981 | 27612 | 6586 | 6497 |
| SW × Ha | 17666 | 14898 | 10769 | 11125 |

TABLE 13-continued

Results of Evaluation

|  | Ex. 10 | Ex. 11 | Ex. 12 | Com. Ex. 19 |
|---|---|---|---|---|
| Ball performance | | | | |
| Durability | S | S | S | A |
| Feel at impact | S | S | C | C |

TABLE 14

Results of Evaluation

|  | Ex. 13 | Com. Ex. 20 | Ex. 14 |
|---|---|---|---|
| Mc (DLc ≥ 50) (phr) | 15 | 0 | 15 |
| Mi (DLi ≥ 5) (phr) | 56 | 56 | 56 |
| Sum (Mc + Ci) | 71 | 56 | 71 |
| Ratio (Mc/Mi) | 0.27 | 0 | 0.27 |
| Sulfur content (wt. %) | 2.04 | 2.04 | 2.04 |
| Ratio B/N | 1.00 | 1.00 | 0.25 |
| $N_{2A}$ (×10$^{-10}$) | 13.0 | — | 6.24 |
| $N_{2B}$ (×10$^{-10}$) | — | 16.4 | — |
| $N_{2A}/N_{2B}$ | 0.79 | — | 0.67 |
| Ha (shore A) | 76 | 75 | 75 |
| EB (%) | 385 | 392 | 428 |
| SW (%) | 204 | 221 | 191 |
| tanδ (20° C.) | 0.048 | 0.046 | 0.065 |
| EB × Ha | 29260 | 29400 | 32100 |
| SW × Ha | 15504 | 16575 | 14325 |
| Ball performance | | | |
| Durability | B | C | S |
| Feel at impact | S | S | S |

As shown in Tables 8 to 14, the rubber compositions and the tennis balls of the Examples are highly rated as compared to the rubber compositions and the tennis balls of the Comparative Examples. From the evaluation results, advantages of the present invention are clear.

The rubber composition described above is applicable to production of various hollow balls filled with compressed gas. The above descriptions are merely illustrative examples, and various modifications can be made without departing from the principles of the present invention.

What is claimed is:

1. A rubber composition for a hollow ball, the rubber composition including a base rubber, an inorganic filler composed of particles, and a carbon-based filler, wherein a degree of flatness DLc obtained by dividing an average particle diameter $D_{50}^c$ (μm) of the carbon-based filler by an average thickness Tc (μm) of the carbon-based filler is not less than 110, a weight ratio Mc/Mi of an amount Mc of the carbon-based filler to an amount Mi of the inorganic filler is not less than 0.04 and not greater than 1.00, a degree of flatness DLi obtained by dividing an average particle diameter $D_{50}^i$ (μm) of the inorganic filler by an average thickness Ti (μm) of the inorganic filler is not less than 20, and an amount of the inorganic filler per 100 parts by weight of the base rubber is not less than 1 parts by weight and not greater than 150 parts by weight.

2. The rubber composition according to claim 1, wherein a nitrogen gas permeability coefficient $N_{2A}$ (cm$^3$·cm/cm$^2$/sec/cmHg) at 40° C. of the rubber composition satisfies the following formula (1), $$N_{2A}/N_{2B} \leq 0.95 \quad (1)$$

wherein $N_{2B}$ is a nitrogen gas permeability coefficient (cm$^3$·cm/cm$^2$/sec/cmHg) at 40° C. of a rubber composition obtained by replacing the carbon-based filler having a degree of flatness DLc of not less than 50 with a carbon-based filler having a degree of flatness DLc of 1.

3. The rubber composition according to claim 1, wherein the carbon-based filler includes carbon atoms by not less than 90% by weight of entire components thereof.

4. The rubber composition according to claim 1, wherein the carbon-based filler is selected from the group consisting of carbon fibers, graphites, graphenes, and carbon nanotubes.

5. The rubber composition according to claim 1, wherein the average particle diameter $D_{50}^c$ of the carbon-based filler is not less than 0.01 μm and not greater than 100 μm.

6. The rubber composition according to claim 1, wherein the inorganic filler is selected from the group consisting of talc, kaolin clay, and mica.

7. The rubber composition according to claim 1, wherein the average particle diameter $D_{50}^i$ of the inorganic filler is not less than 0.01 μm and not greater than 100 μm.

8. The rubber composition according to claim 1, wherein the base rubber includes a butadiene rubber and a natural rubber, and a weight ratio B/N of an amount B of the butadiene rubber to an amount N of the natural rubber in the base rubber is not greater than 1.4.

9. The rubber composition according to claim 1, wherein the rubber composition has a sulfur content of not less than 0.01% by weight and not greater than 10% by weight.

10. The rubber composition according to claim 1, wherein the rubber composition has a nitrogen gas permeability coefficient $N_{2A}$ at 40° C. of not greater than 3.0×10$^{-9}$ (cm$^3$·cm/cm$^2$/sec/cmHg).

11. The rubber composition according to claim 1, wherein the rubber composition has a Shore A hardness Ha of not less than 20 and not greater than 88.

12. The rubber composition according to claim 1, wherein the rubber composition has a loss tangent tan δ at 20° C. of not greater than 1.0.

13. The rubber composition according to claim 1, wherein a product of a Shore A hardness Ha of the rubber composition and elongation at break EB (%) of the rubber composition obtained according to JIS K6251 is not less than 1,000 and not greater than 100,000.

14. The rubber composition according to claim 1, wherein a product of a Shore A hardness Ha of the rubber composition and a toluene swelling ratio SW (%) of the rubber composition obtained according to JIS K6258 is not less than 2,500 and not greater than 50,000.

15. The rubber composition according to claim 1, wherein the hollow ball is a tennis ball.

16. A method for producing a rubber composition for a hollow ball, the method comprising:
a first step of mixing a base rubber and a carbon-based filler having a degree of flatness particle diameter $D_{50}^c$ (μm) of the carbon-based filler by an average thickness Tc (μm) of the carbon-based filler; and
a second step of adding an inorganic DLc of not less than 110, to obtain a master batch, the degree of flatness DLc being obtained by dividing an average filler composed of particles to the master batch to orient the particles that form the inorganic filler, in the base rubber, wherein
a weight ratio Mc/Mi of an amount Mc of the carbon-based filler to an amount Mi of the inorganic filler is not less than 0.04 and not greater than 1.00,
a degree of flatness DLi obtained by dividing an average particle diameter $D_{50}^i$ (μm) of the inorganic filler by an average thickness Ti (μm) of the inorganic filler is not less than 20, and an amount of the inorganic filler per 100 parts by weight of the base rubber is not less than 1 parts by weight and not greater than 150 parts by weight.

17. A hollow ball comprising a hollow core formed from a rubber composition, wherein
the rubber composition includes a base rubber, an inorganic filler composed of particles, and a carbon-based filler,
a degree of flatness DLc obtained by dividing an average particle diameter $D_{50}^c$ (μm) of the carbon-based filler by an average thickness Tc (μm) of the carbon-based filler is not less than 110,
a weight ratio Mc/Mi of an amount Mc of the carbon-based filler to an amount Mi of the inorganic filler is not less than 0.04 and not greater than 1.00,
a degree of flatness DLi obtained by dividing an average particle diameter $D_{50}^i$ (μm) of the inorganic filler by an average thickness Ti (μm) of the inorganic filler is not less than 20, and an amount of the inorganic filler per 100 parts by weight of the base rubber is not less than 1 parts by weight and not greater than 150 parts by weight.

* * * * *